US007211228B2

(12) United States Patent
Suzuki et al.

(10) Patent No.: US 7,211,228 B2
(45) Date of Patent: May 1, 2007

(54) HEATER FOR HYDROGEN STORAGE SYSTEM

(75) Inventors: Takanori Suzuki, Wako (JP); Fumiaki Aono, Tokyo (JP); Manabu Ito, Tokyo (JP); Izuru Kanoya, Wako (JP); Mitsuya Hosoe, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 618 days.

(21) Appl. No.: 10/100,985

(22) Filed: Mar. 20, 2002

(65) Prior Publication Data

US 2002/0134370 A1 Sep. 26, 2002

(30) Foreign Application Priority Data

Mar. 21, 2001 (JP) .............................. 2001-081013

(51) Int. Cl.
*B01J 8/02* (2006.01)
*F17C 11/00* (2006.01)

(52) U.S. Cl. ...................... 422/198; 422/220; 422/222; 96/126; 96/146

(58) Field of Classification Search ................ 422/198, 422/200, 211, 218, 220, 222, 190, 192; 423/658.2; 429/19, 20; 96/126, 143, 146; F17C 11/00
See application file for complete search history.

(56) References Cited

U.S. PATENT DOCUMENTS

| 5,015,444 A | * | 5/1991 | Koga et al. ................. 422/195 |
| 5,609,834 A | * | 3/1997 | Hamada et al. ............. 422/196 |
| 6,099,811 A | * | 8/2000 | Stetson et al. ............. 422/212 |

FOREIGN PATENT DOCUMENTS

| JP | 01130733 A | * | 5/1989 |
| JP | 05106791 A | * | 4/1993 |
| JP | 08159599 A | * | 6/1996 |
| JP | 9-227101 | | 9/1997 |

* cited by examiner

*Primary Examiner*—Glenn Caldarola
*Assistant Examiner*—Jennifer A. Leung
(74) *Attorney, Agent, or Firm*—Arent Fox LLP

(57) ABSTRACT

A heater is disposed in contact with a hydrogen storage unit filled with a hydrogen absorption material. The heater includes at least one combustion chamber which includes a catalyst carrier and in which a combustible gas is burned, a combustible gas burning catalyst carried on the catalyst carrier, at least one combustible gas introduction chamber adjoining the combustion chamber with its chamber wall interposed therebetween, a plurality of combustible gas inlets disposed in a dispersed manner in the chamber wall to permit the combustion chamber and the introduction chamber to communicate with each other, and a combustion gas outlet communicating with the combustion chamber. Thus, the degree of uniformity of a temperature profile is decreased.

9 Claims, 16 Drawing Sheets

HEATER FOR HYDROGEN STORAGE SYSTEM

BACKGROUND OF THE INVENTION

1. Field of the Invention

The present invention relates to a heater for a hydrogen storage system, and particularly to a heater which is disposed in contact with a hydrogen storage unit filled with a hydrogen-absorption material and which is used to release hydrogen from the hydrogen storage unit.

2. Description of the Related Art

A conventionally known heater includes a combustion chamber where a combustible gas is burned, a honeycomb structure serving as a catalyst carrier fitted in the combustion chamber, a combustible gas burning catalyst carried on inner peripheral surfaces of cells in the honeycomb structure, and a combustible gas inlet and a combustion gas outlet communicating with the combustion chamber (see, for example, Japanese Patent Application Laid-open No. 9-227101).

However, the conventionally known heater suffers from the following disadvantage: the catalyst is provided sufficiently and substantially uniformly on the entire inner peripheral surfaces; thus, most of a combustible gas flowing into each of the cells is burned at a flow-in region of the heater, and a reduced amount of the combustible gas reaches a deeper portion of the heater; as a result, the temperature in the heater is higher in the combustible gas flow-in region of the heater, and a large temperature gradient is produced in the heater; resulting in a large degree of ununiformity of a temperature profile. Under such a situation, releasing of hydrogen cannot be conducted with a good efficiency.

SUMMARY OF THE INVENTION

Accordingly, it is an object of the present invention to provide a heater of the above-described type, wherein the degree of ununiformity of the temperature profile can be decreased.

To achieve the above object, according to the present invention, there is provided a heater for a hydrogen storage system, which is disposed in contact with a hydrogen storage unit filled with a hydrogen-absorption material. The heater comprises at least one combustion chamber which includes a catalyst carrier and in which a combustible gas is burned, a combustible gas burning catalyst carried on the catalyst carrier, at least one combustible gas introduction chamber adjoining the combustion chamber with its chamber wall interposed therebetween, a plurality of combustible gas inlets disposed in a dispersed manner in the chamber wall to permit the combustion chamber and the introduction chamber to communicate with each other, and a combustion gas outlet communicating with the combustion chamber.

With the above arrangement, the combustible gas can be supplied through the plurality of inlets arranged in the dispersed manner into the combustion chamber, and combustion of the combustible gas can be caused over the entire combustion chamber. Thus, it is possible to decrease the degree of ununiformity of the temperature profile in the heater.

The above and other objects, features and advantages of the invention will become apparent from the following description of the preferred embodiment taken in conjunction with the accompanying drawings.

DESCRIPTION OF THE PREFERRED EMBODIMENTS

Figure 1:
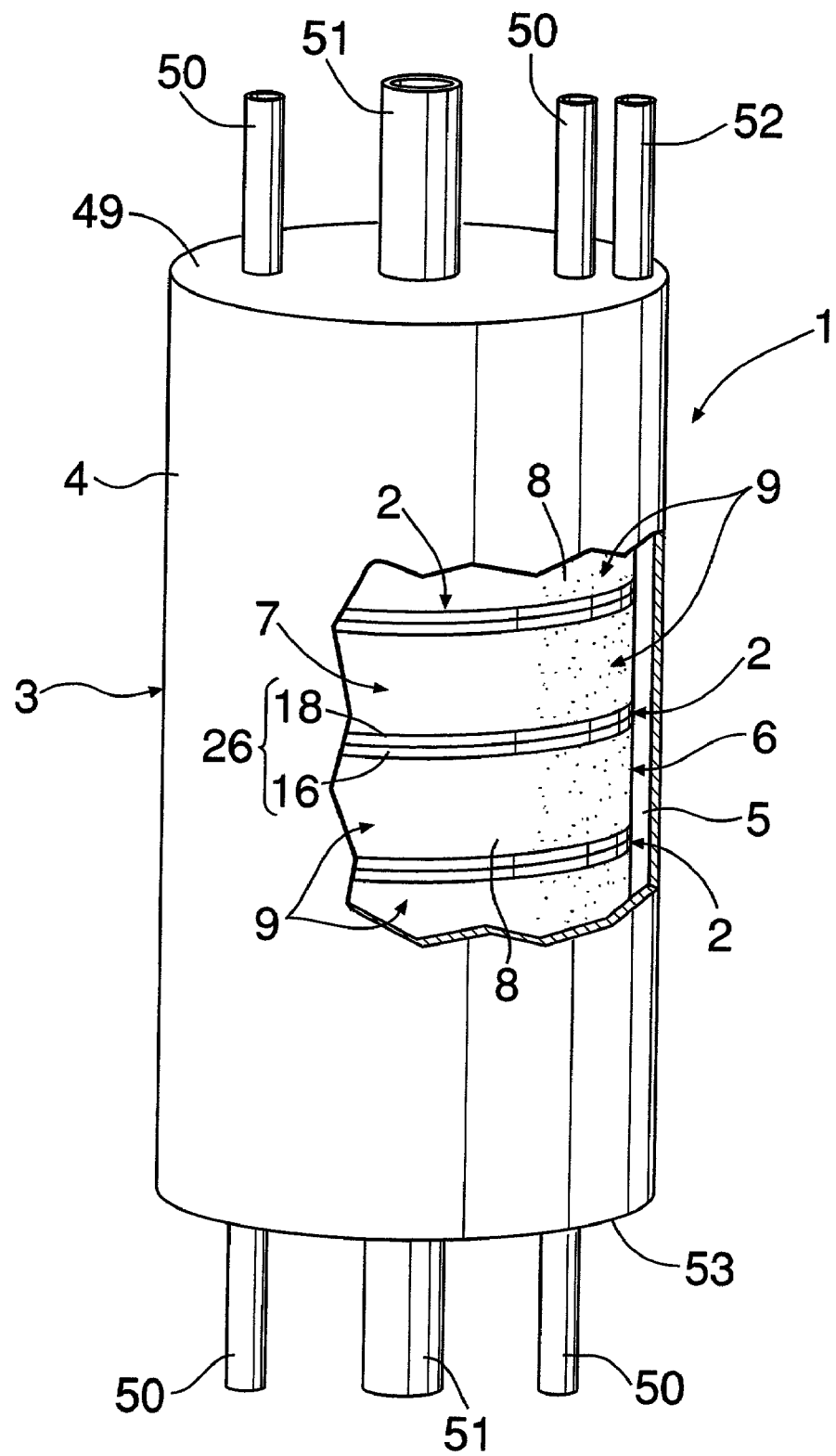
FIG. 1 is a perspective view of a first embodiment of a hydrogen storage system according to the present invention with an essential portion broken away.

The present invention will now be described by way of embodiments with reference to the accompanying drawings.

FIGS. 1 to 7 shows a first embodiment of a heater 2 in a hydrogen storage system 1. The hydrogen storage system 1 includes a pressure-resistant outer cylinder 3 made of a stainless steel and having a circular cross section. At least one (one in the embodiment) cylindrical hydrogen storage module 6 is accommodated within the outer cylinder 3 in such a manner as to be placed apart from an inner peripheral surface of an outer peripheral wall 4 of the outer cylinder 3 to provide a hydrogen passage 5 therebetween. The cylindrical hydrogen storage module 6 comprises a lamination 7 of a plurality of hydrogen storage units 9 each filled with a powdery hydrogen-absorption material HSM and having a hydrogen absorption desorption surface 8 on a whole outer peripheral surface, while interposing a heater 2 between the adjacent hydrogen storage units 9. Thus, each of the heaters 2 is disposed in contact with the hydrogen storage units 9. Hydrogen storage alloy (for example, a Mg alloy such as $Mg_2Ni$) or carbon with a nanostructure is used as the hydrogen-absorption material HSM. The heaters 2 is provided on a top surface of the uppermost hydrogen storage unit 9 and on a bottom surface of the lowermost hydrogen storage unit 9, respectively, as required.

Figure 2:
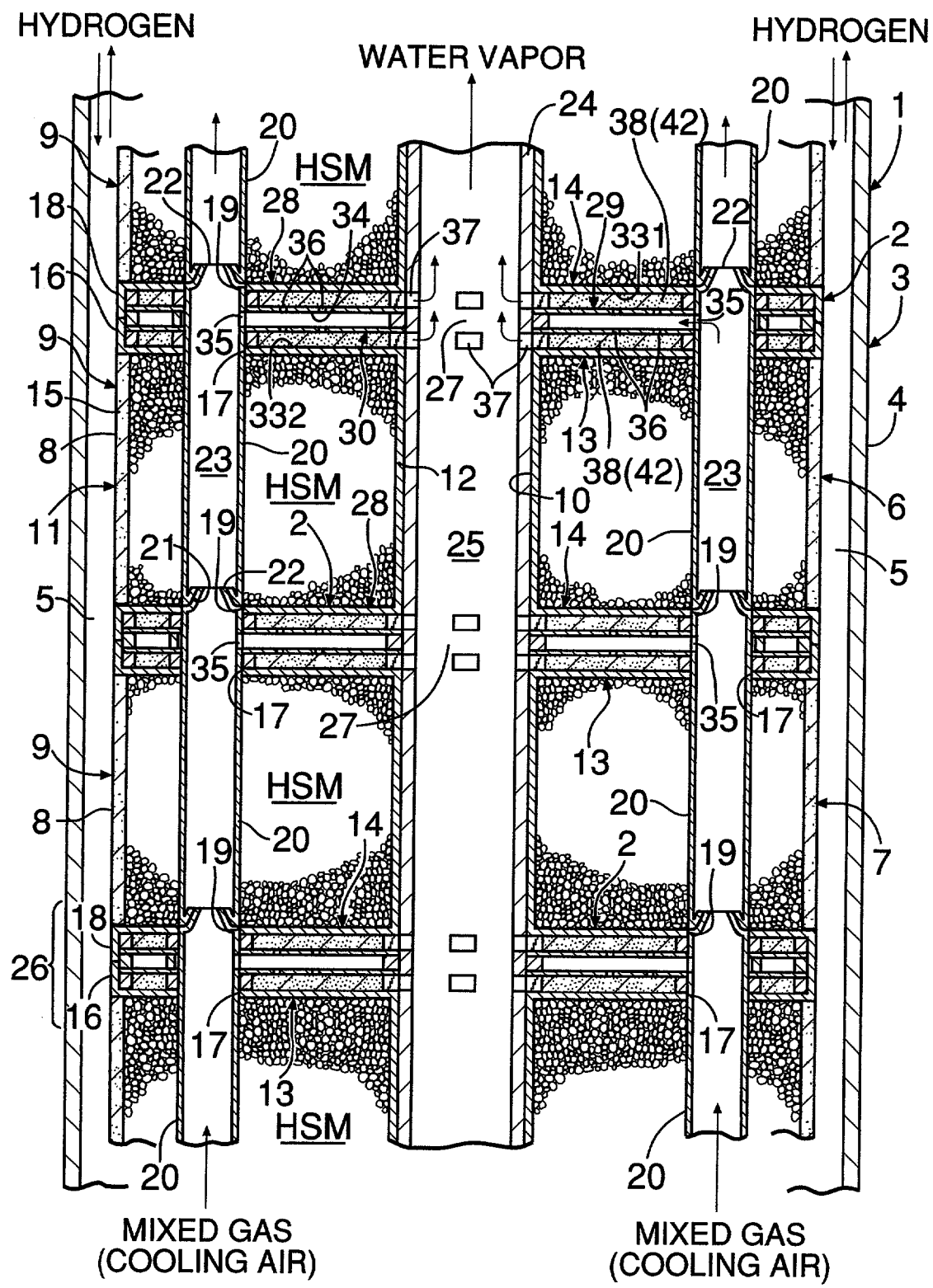
FIG. 2 is a vertical sectional view of the essential portion of the system, corresponding to a sectional view taken along a line 2—2 in FIG. 5.
Figure 3:
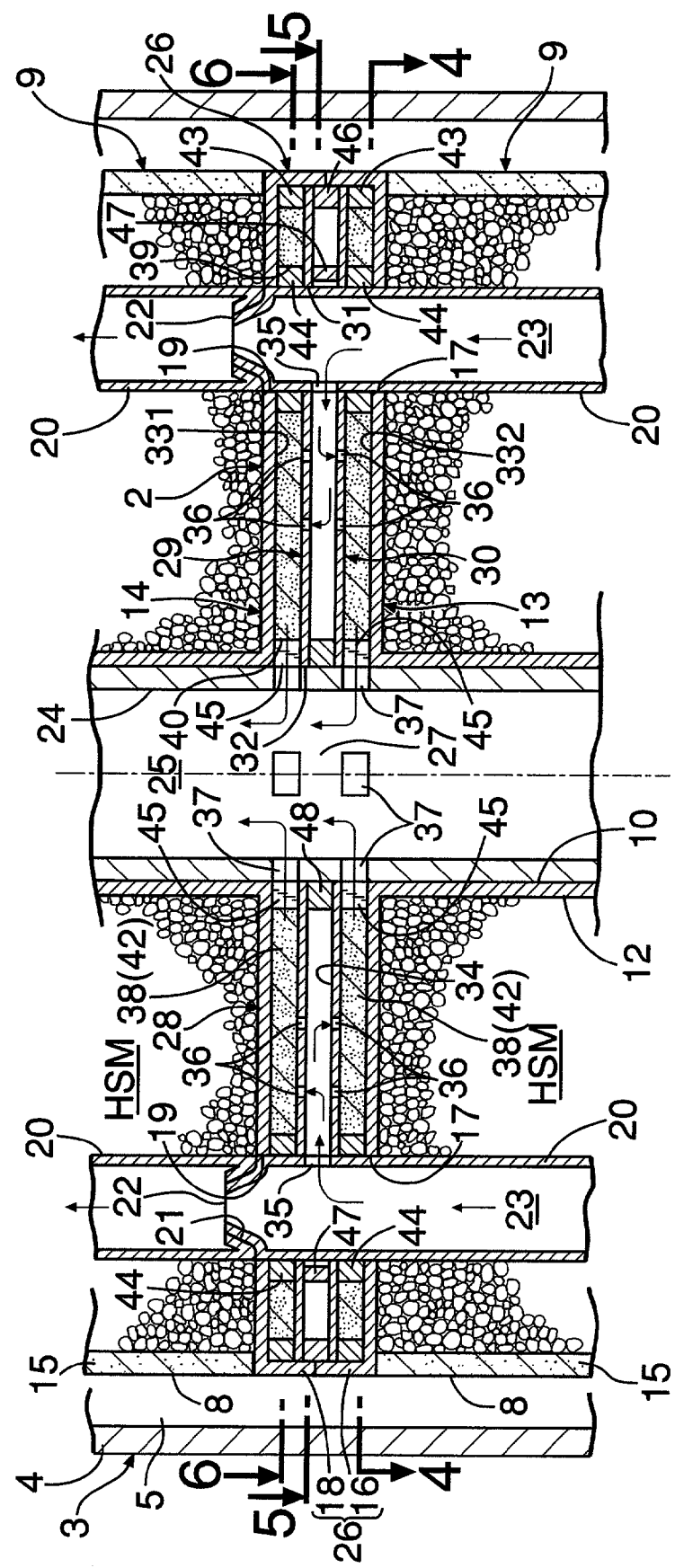
FIG. 3 is an enlarged view of the essential portion shown in FIG. 2.

As best shown in FIGS. 2 and 3, the hydrogen storage unit 9 includes a stainless steel cylinder 11 having a center through hole 10 round its axis. The cylinder 11 is filled with the powdery hydrogen-absorption material HSM, and includes a hollow shaft 12 having the center through hole 10, top and bottom walls 13 and 14 formed integrally with each end of the hollow shaft 12, a porous filter 15 joined by welding or the like between opposed outer peripheries of the top and bottom walls 13 and 14 to form an outer peripheral wall. The filter 15 has a number of pores having a diameter of, for example, 0.1 to 10 µm, through which hydrogen passes so that the whole outer peripheral surface constitutes the hydrogen absorption desorption surface 8.

Figure 4:
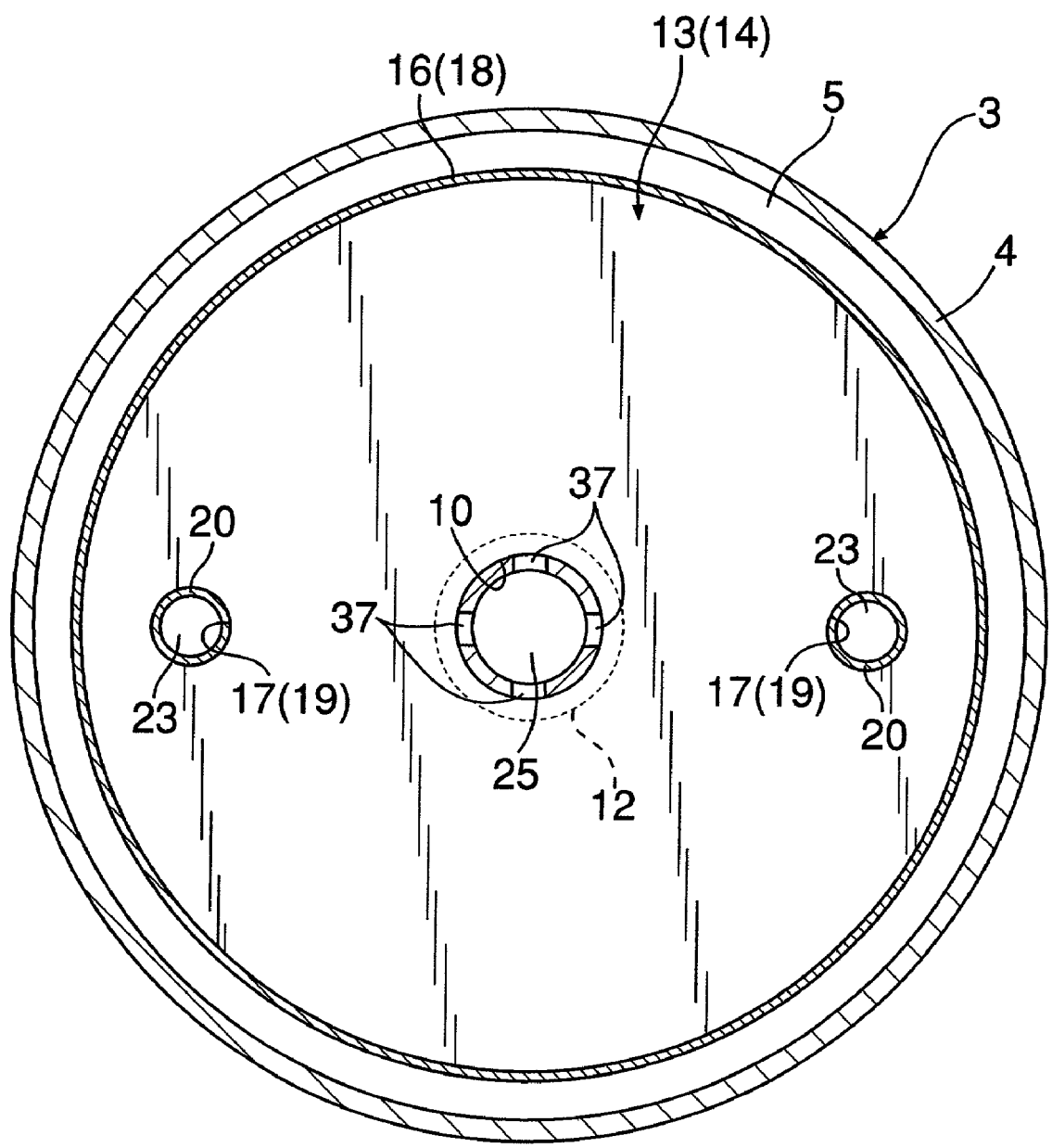
FIG. 4 is a sectional view taken along a line 4—4 in FIG. 3.

As best shown in FIGS. 2 to 4, the top wall 13 includes an annular projection 16 at its outer peripheral edge that extends upward. A pair of peripheral through holes 17 with small diameters are located near the projection 16 in alignment with the center through hole 10. The bottom wall 14 has a structure similar to a structure obtained by turning the top wall 13 upside down, and includes an annular projection 18 at its outer peripheral edge that extends downward. A pair of peripheral through holes 19 are located near the projection 18 and coaxially with the two peripheral through holes 17, respectively, of the top wall 13. Connecting unit pipes 20 made of stainless steel are disposed in the two sets of the peripheral through holes 17 and 19 situated coaxially with the top and bottom walls 13 and 14, and are joined around the bores by welding or the like.

A lower end edge of each of the unit pipes 20 corresponds to an edge of an upper opening of each of the peripheral through holes 19, and a lower opening 21 in the unit pipe 20 is formed into a frustoconical shape with its larger diameter portion directed downward. A top end 22 of the unit pipe 20 project out of the top wall 13 such that the top end 22 is positioned above the top surface of the annular projection 16 of the top wall 13, and is frustoconically shaped with its larger diameter portion also directed downward so as to fit in the lower opening 21.

Figure 5:
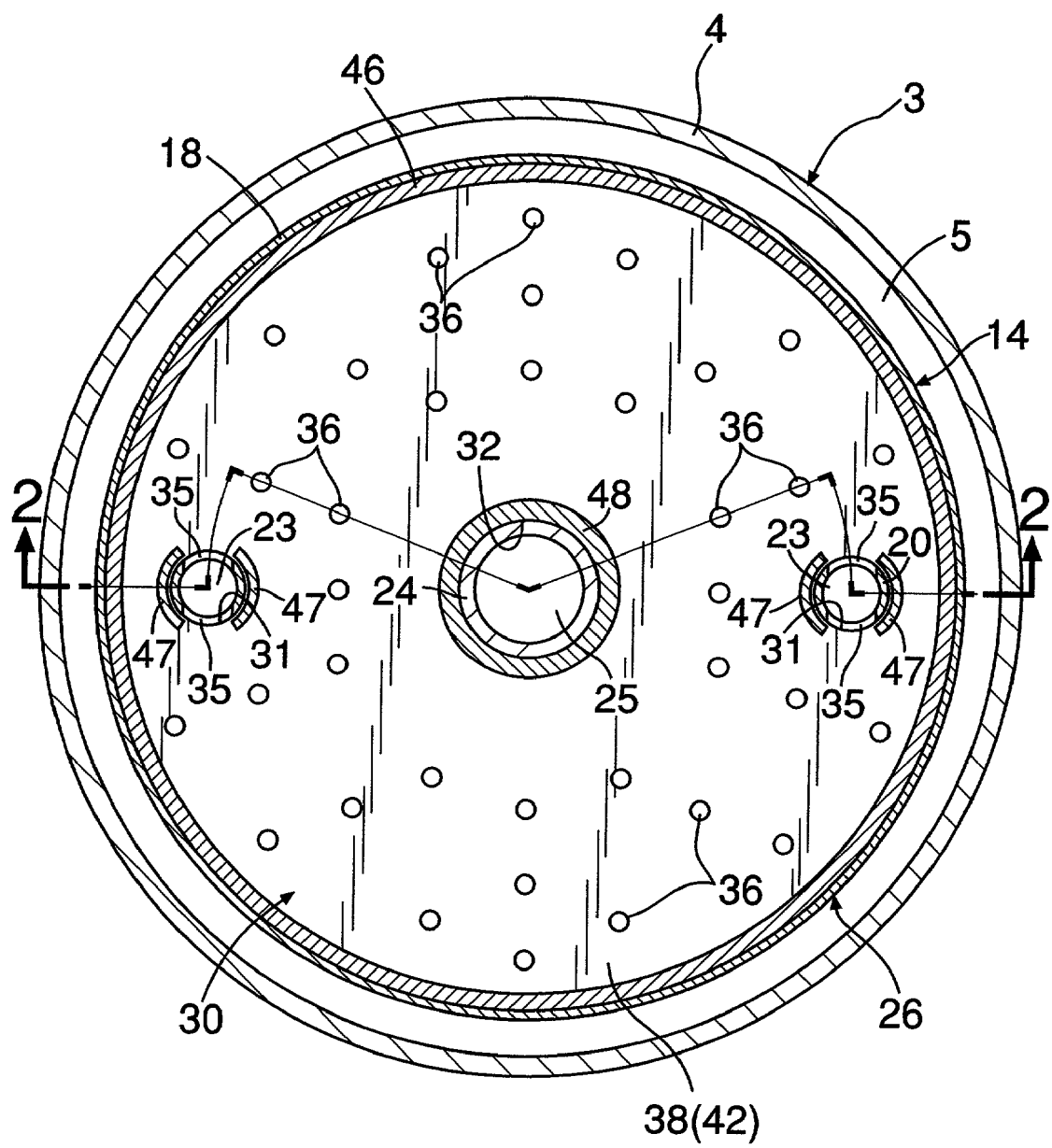
FIG. 5 is a sectional view taken along a line 5—5 in FIG. 3.

In the lamination 7, the adjacent hydrogen storage units 9, specifically the brim surface of the annular projection 16 at the top wall 13 of the lower hydrogen storage unit 9 and the brim surface of the annular projection 18 at the bottom wall 14 of the upper hydrogen storage unit 9, are mated together and joined, for example, by welding or the like. The frustoconical top end 22 of the unit pipe 20 at the lower hydrogen storage unit 9 is fitted into the frustoconical lower openings 21 of the neighboring unit pipes 20 at the upper hydrogen storage unit 9. These steps is repeated using the unit pipes 20 to form two arrays of the unit pipes 20. The interior of the unit pipes 20 functions as a series of first passages 23 for a combustible gas. A single pipe 24 made of a stainless steel is fitted through the series of center through holes 10 in the hydrogen storage units 9, and the interior of the pipe 24 functions as a second passage 25 through which a combustion gas produced by the combustion of the combustible gas passes. Between the adjacent hydrogen storage units 9, a housing 28 for the heater 2 is formed, which shares the top and bottom walls 14 and 13 as its bottom and top walls. The housing 28 has an outer peripheral wall 26 formed by the joined annular projections 16 and 18, and an inner peripheral wall 27 formed by a portion of the single pipe 24. Two disk-shaped upper and lower chamber walls 29 and 30 are disposed in an annular space within the housing 28. Each of the disk-shaped upper and lower chamber walls 29 and 30 is made of a stainless steel or the like, and, as shown in FIG. 5, has two peripheral through holes 31 and a center through hole 32 into which the unit pipes 20 and the single pipe 24 are fitted, respectively, and an outer peripheral surface which is in close contact with an inner peripheral surface of the outer peripheral wall 26. The two upper and lower chamber walls 29 and 30 divide the inside of the housing 28 into three chambers. Two of the three chambers function as upper and lower combustion chambers 33₁ and 33₂ which are defined between the bottom wall 14 and the upper chamber wall 29 and between the top wall 13 and the lower chamber wall 30 respectively, and in which the combustible gas is burned, and the remaining one chamber functions as a combustible gas introduction chamber 34 defined between the upper and lower chamber walls 29 and 30. Thus, the introduction chamber 34 adjoins the upper and lower combustion chambers 33₁ and 33₂ with the upper and lower chamber walls 29 and 30 interposed therebetween.

Figure 6:
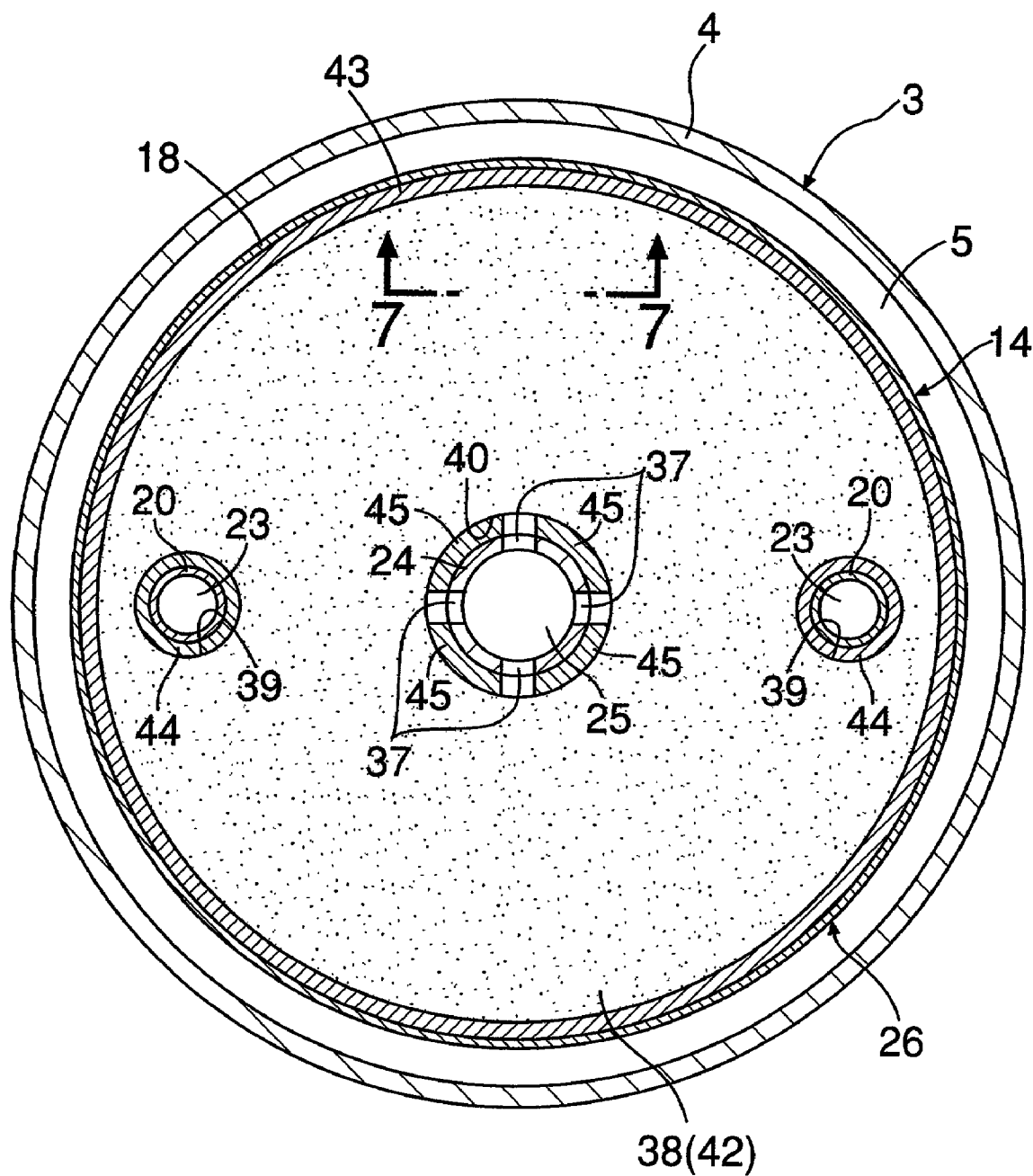
FIG. 6 is a sectional view taken along a line 6—6 in FIG. 3.

A pair of combustible gas introduction ports 35 are defined in portions of each of the unit pipes 20 facing the introduction chamber 34, and a plurality of combustible gas inlets 36 are defined in each of the upper and lower chamber walls 29 and 30 in such a manner that they are dispersed over the entire walls 29 and 30 to permit the upper and lower combustion chambers 33₁ and 33₂ to communicate with the introduction chamber 34. Further, four combustion gas outlets 37 are defined in portions of the single pipe 24 facing the upper and lower combustion chambers 33₁ and 33₂, as also shown in FIG. 6. Each of the introduction ports 35 orients toward a direction of arrangement of the center through hole 32 and the peripheral through holes 31, namely, a direction intersecting a diametrical direction. Two of the outlets 37 orients toward the diametrical direction, while the other two outlets 37 orients toward the direction intersecting the diametrical direction.

Figure 7:
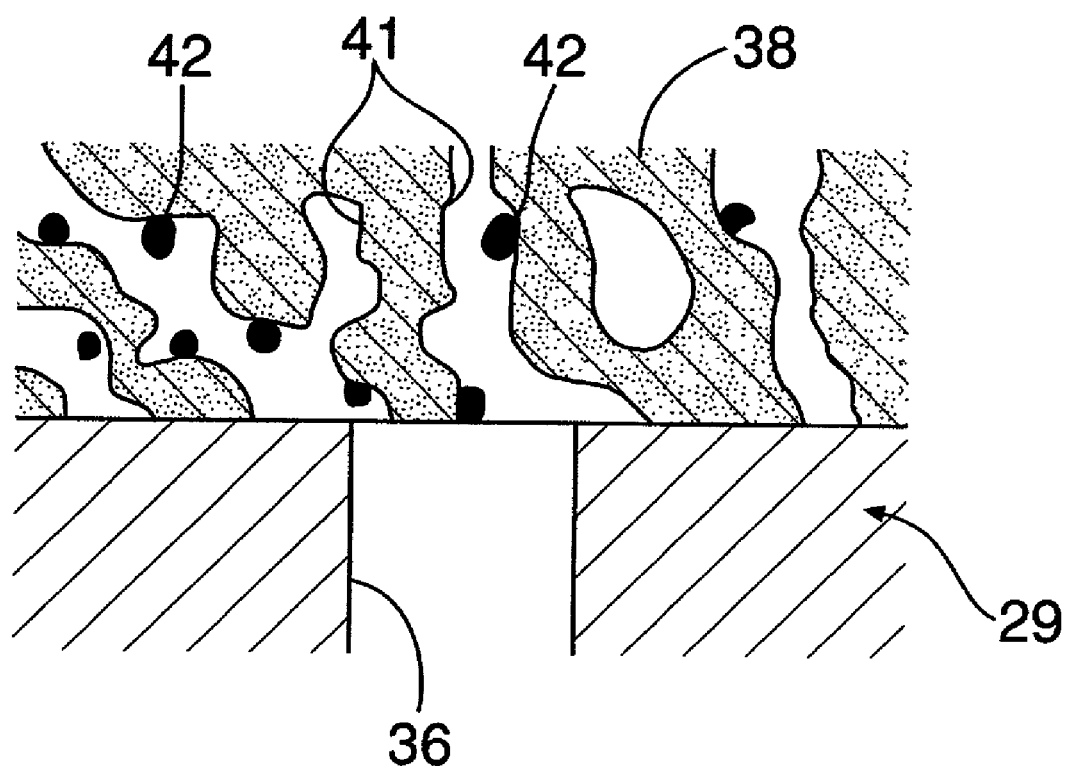
FIG. 7 is an enlarged sectional view taken along a line 7—7 in FIG. 6.

A disk-shaped porous heat-resistant material 38 is disposed as a catalyst carrier within the upper and lower combustion chambers 33₁ and 33₂, respectively, and sandwiched between the bottom wall 14 and the upper chamber wall 29 and between the top wall 13 and the lower chamber wall 30, respectively. The heat-resistant material 38 is made of metal (for example, Ni), ceramic or the like and has two peripheral through holes 39 and a center through hole 40 corresponding to the unit pipes 20 and the single pipe 24, respectively. As best shown in FIG. 7, a combustible gas burning catalyst 42 is carried on inner surfaces of continuous pores 41 in the heat-resistant material 38.

In order to maintain the upper and lower combustion chambers 33₁ and 33₂ and the introduction chamber 34, a plurality of spacers made of a metal such as stainless steel, Ni and the like, ceramic or the like are disposed within each of the upper and lower combustion chambers 33₁ and 33₂. The spacers are clamped between the bottom wall 14 and the upper chamber wall 29; between the upper and lower chamber walls 29 and 30; and between the top wall 13 and the lower chamber wall 30, respectively. More specifically, in each of the heat-resistant materials 38, an annular spacer 43 having a larger diameter is fitted between an outer peripheral surface of each heat-resistant material 38 and the inner peripheral surface of the outer peripheral wall 26; an annular spacer 44 having a smaller diameter is fitted between an inner peripheral surface of each peripheral through hole 39 and the outer peripheral surface of each unit pipe 20; and further, a quartered arcuate spacer 45 is fitted between the inner peripheral surface of the center through hole 40 and the outer peripheral surface of the single pipe 24 so that it does not close each of the outlets 37. On the other hand, the following spacers are located within the introduction chamber 34: an annular spacer 46 which has a larger diameter and which is in close contact with the inner peripheral surface of the outer peripheral wall 26, a pair of arcuate spacers 47 disposed around the unit pipes 20 so that they do not close the introduction ports 35, and an annular spacer 48 which has a smaller diameter and which is in close contact with the single pipe 24.

A mixed gas of, for example, hydrogen and oxygen (air may be used) may be used as the combustible gas, and platinum, palladium or the like may be used as the gas burning catalyst 42.

As best shown in FIG. 1, first, second and third connecting pipes 50, 51 and 52 are retained on a top wall 49 of the outer cylinder 3 to communicate with the top ends of the unit pipes 20 and the single pipe 24 as well as an upper portion of a hydrogen passage 53. On the other hand, the first and second connecting pipes 50 and 51 are retained on the bottom wall 53 of the outer cylinder 3 to communicate with the lower end portions of the unit pipes 20 and the single pipe 24.

To release hydrogen absorbed in the powdery hydrogen-absorption material HSM in each of the hydrogen storage units 9, a mixed gas of hydrogen and air is supplied into each of the first passages 23 through the lower end thereof to pass through the passage 23, as shown in FIG. 2. In this process, the mixed gas is narrowed by the frustoconical top end 22 of the unit pipe 20, so that the mixed gas pool forms at a location downstream of the frustoconical top end 22. The mixed gas from the gas pool passes through the introduction ports 35 into the introduction chamber 34. The mixed gas flows in a jetted manner into the upper and lower combustion chambers 33₁ and 33₂ through the inlets 36 in the upper and lower chamber walls 29 and 30, where it is burned within the heat-resistant material 38 under the presence of the catalyst 42 such as platinum or the like. Thus, a combustion heat and heated water vapor serving as a combustion gas are produced, and the heated water vapor passes via the outlets 37 through the second passage 25.

In this case, the mixed gas can be supplied through the plurality of inlets 36 arranged in the dispersed manner into the upper and lower combustion chambers 33₁ and 33₂, and the combustion of the mixed gas can be caused in the entire regions of the combustion chambers 33₁ and 33₂. Thus, the degree of ununiformity of the temperature profile of the heater 2 due to the combustion heat, can be decreased.

In addition, since the upper and lower combustion chambers 33₁ and 33₂ are in direct contact with the upper and lower hydrogen storage units 9, the combustion heat and thus the heat from the heater 2 is transmitted through wide heat transfer surfaces of the combustion chambers 33₁ and 33₂ to the powdery hydrogen-absorption material HSM, and the heat of the heated water vapor is transmitted through the single pipe 24 to the powdery hydrogen-absorption material HSM. Therefore, the powdery hydrogen-absorption material HSM is heated with a good efficiency, which permits a rapid hydrogen desorption from the wide hydrogen absorption desorption surface 8, and the thus-released hydrogen passes through the hydrogen passage 5.

To absorb hydrogen into the powdery hydrogen-absorption material HSM, hydrogen is introduced into the hydrogen passage 5. The hydrogen passes through the filter 15 in each of the hydrogen storage units 9 over the entire periphery of the filter 15, and absorbed into the powdery hydrogen-absorption material HSM. In this case, cooling air is allowed to pass through the first passage 23, the introduction chamber 34, the upper and lower combustion chambers 33₁ and 33₂ and the second passage 25 to cool the powdery hydrogen-absorption material HSM with a good efficiency, whereby the accumulation of heat in the powdery hydrogen-absorption material HSM is avoided.

Figure 8:
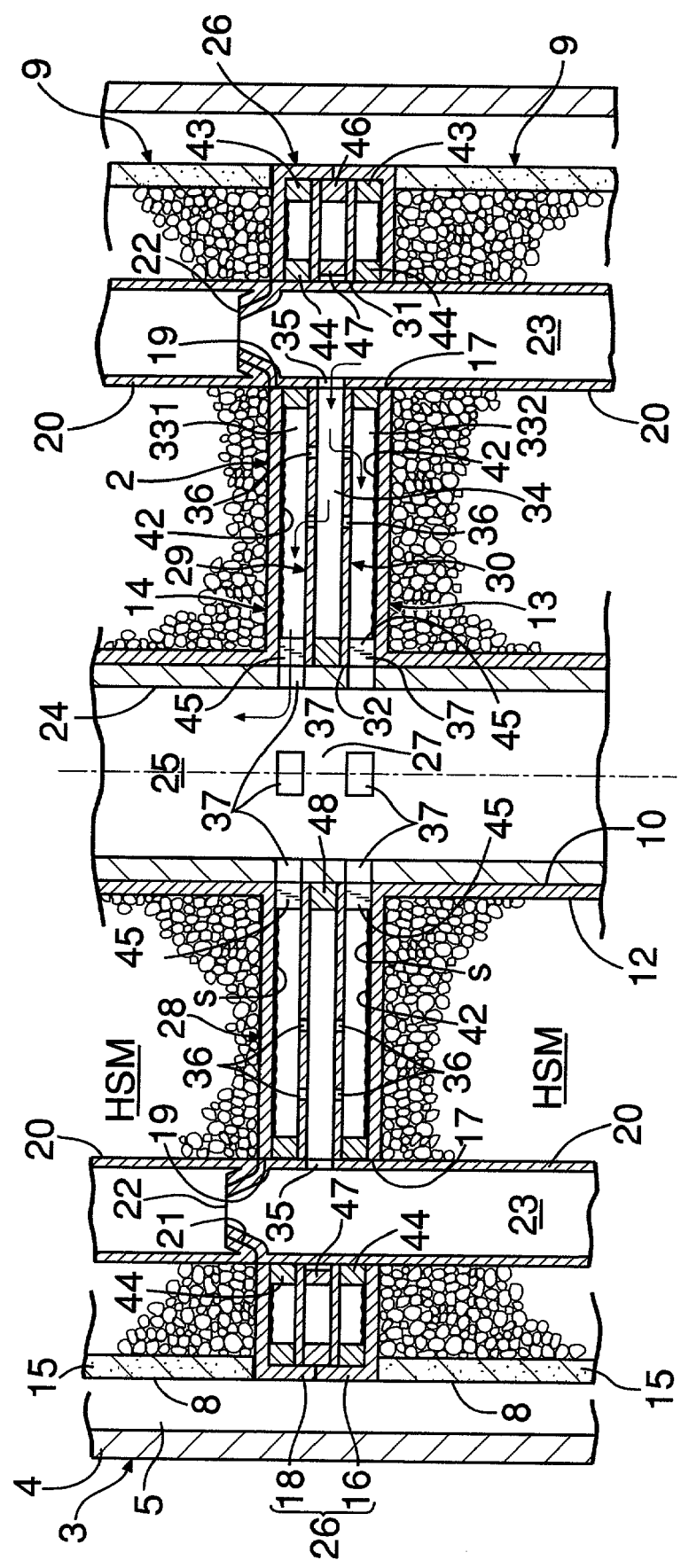
FIG. 8 is a sectional view similar to FIG. 3, but showing an essential portion of a second embodiment of the hydrogen storage system.
Figure 9:
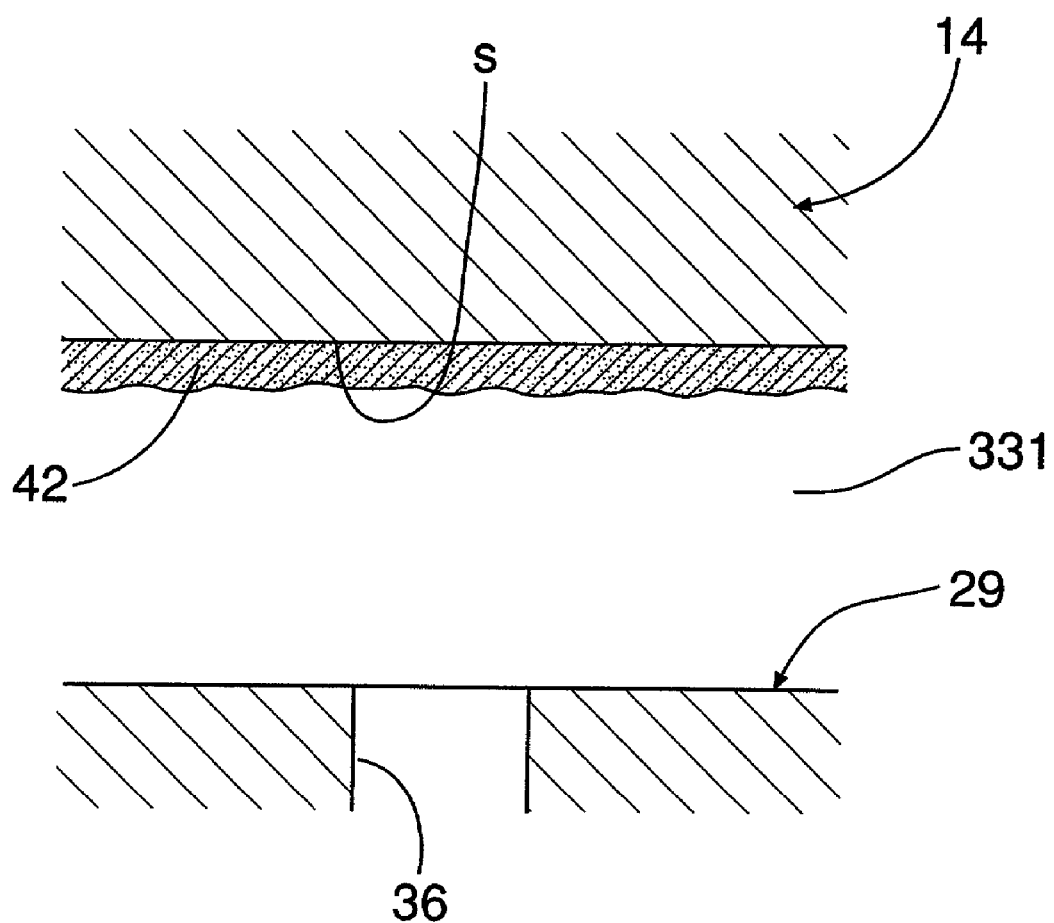
FIG. 9 is an enlarged view of the essential portion shown in FIG. 8.

FIGS. 8 and 9 show a second embodiment of a heater 2 in the hydrogen storage system 1. In this case, the catalyst carrier is inner surfaces s of upper and lower combustion chambers 33₁ and 33₂, i.e., outer surfaces of the top and bottom walls 13 and 14 in the embodiment, and a layer of a catalyst 42 is applied and formed on each of the outer surfaces. The other arrangement is substantially the same as in the first embodiment and hence, portions or components corresponding to those in the first embodiment are designated by the same reference numerals and symbols in FIG. 8, and the detailed description of them is omitted.

According to the second embodiment, an effect similar to that in the first embodiment can be obtained.

The first and second embodiments may be modified in such a manner that one of the upper and lower combustion chambers 33₁ and 33₂ is omitted.

Figure 10:
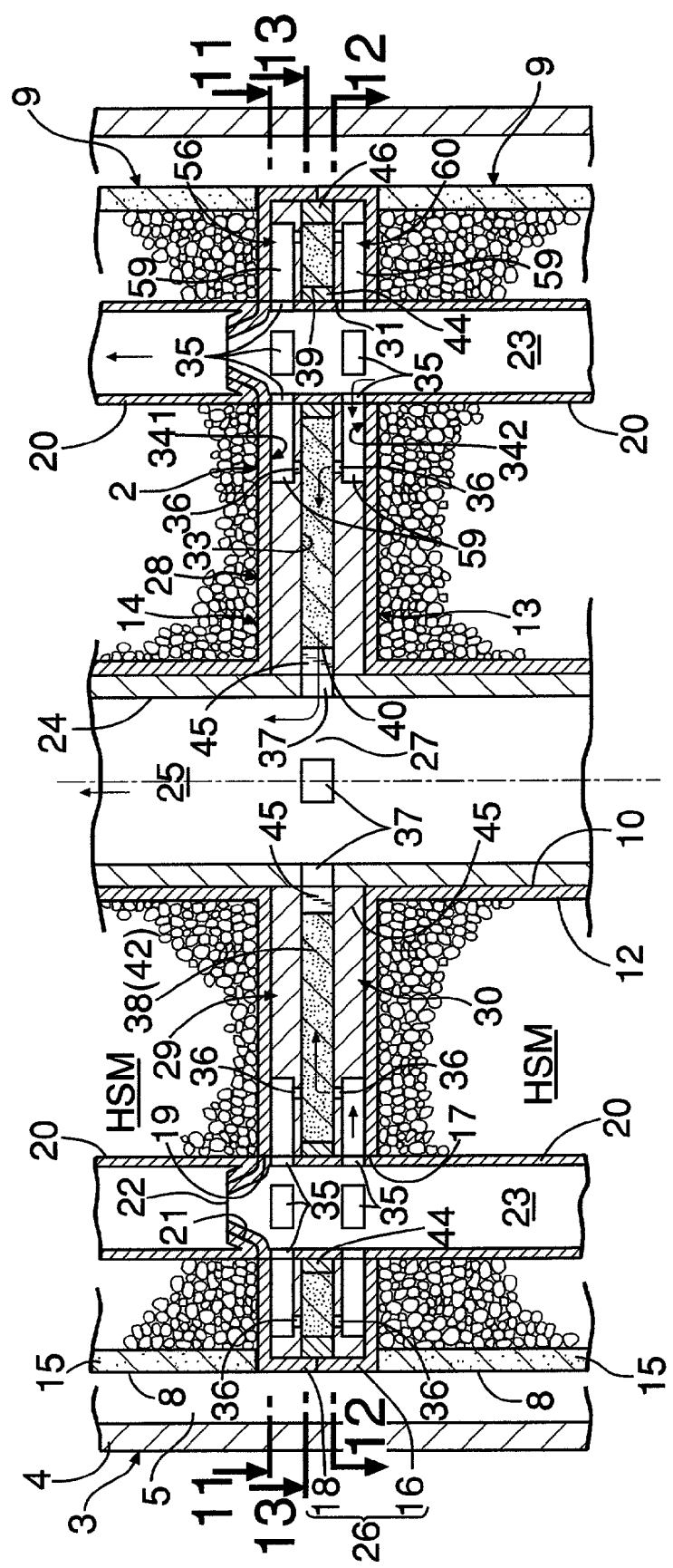
FIG. 10 is a sectional view similar to FIG. 3, but showing an essential portion of a third embodiment of the hydrogen storage system.
Figure 11:
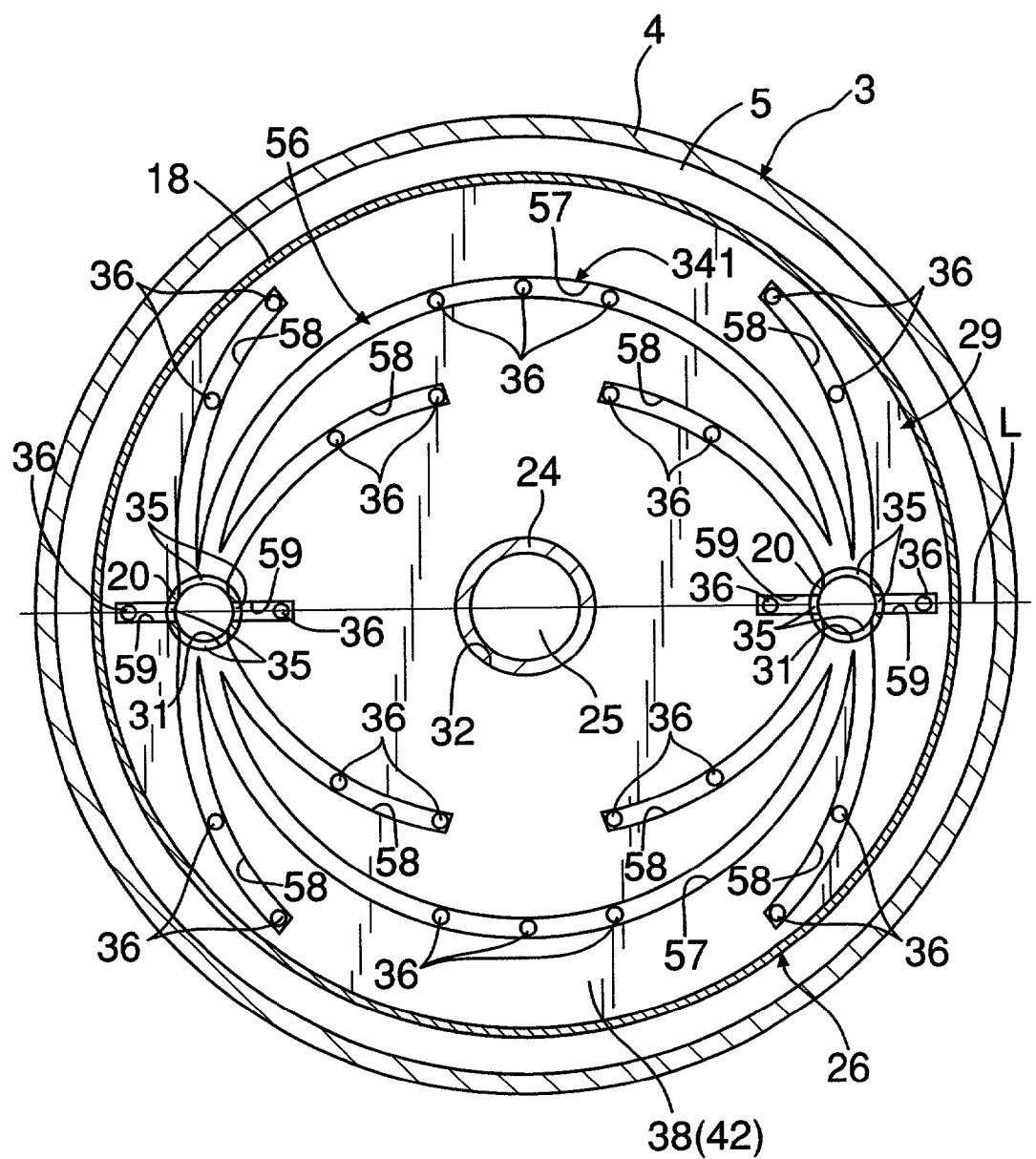
FIG. 11 is a sectional view taken along a line 11—11 in FIG. 10.
Figure 12:
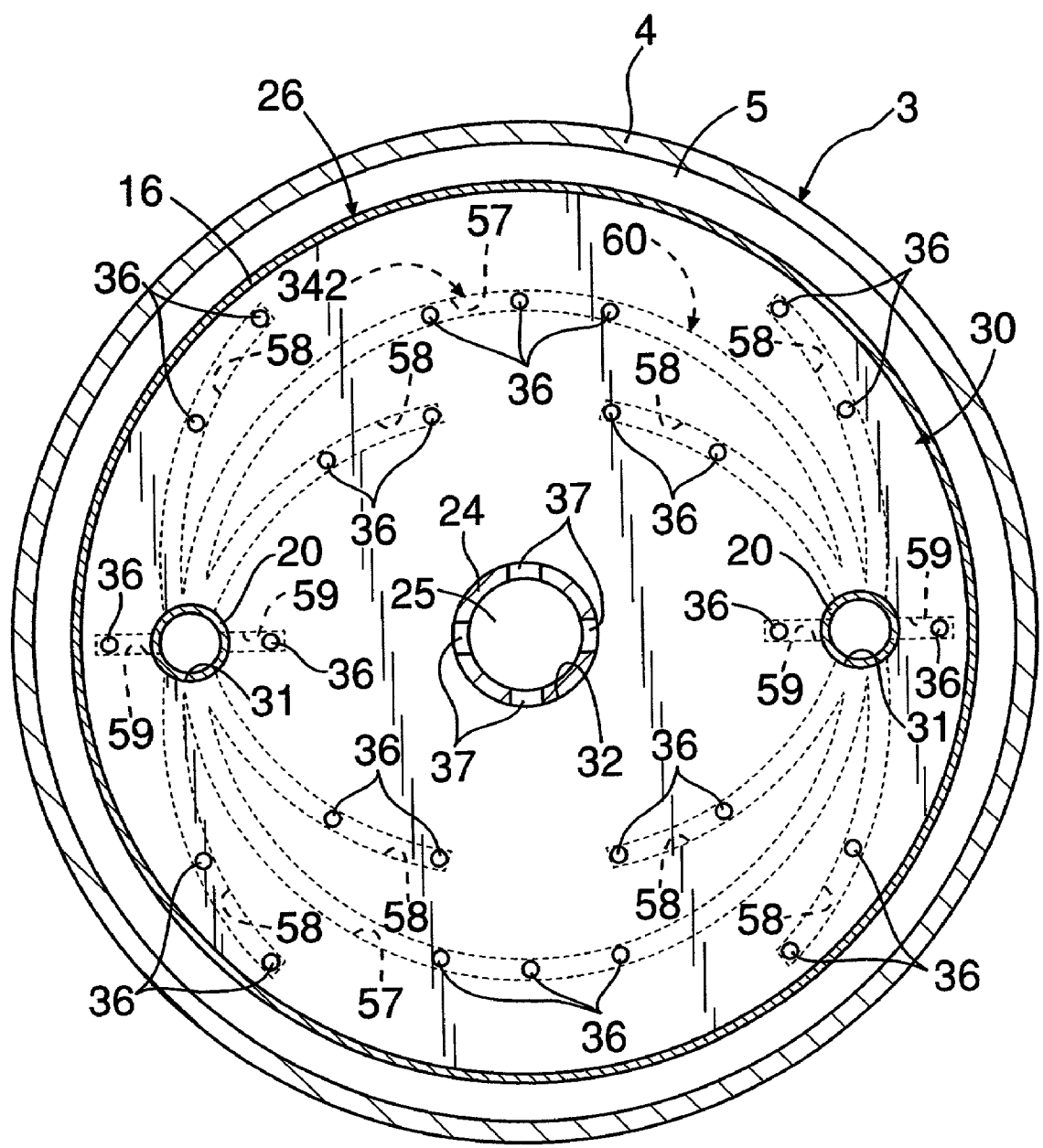
FIG. 12 is a sectional view taken along a line 12—12 in FIG. 10.

FIGS. 10 to 13 show a third embodiment of a heater 2 in the hydrogen storage system 1. As in the previous embodiments, a housing 28 for the heater 2 is formed between the adjacent hydrogen storage units 9, the housing 28 sharing the top and bottom walls 14 and 13 as its bottom and top walls. The housing 28 has an outer peripheral wall 26 formed by the joined annular projections 16 and 18, and an inner peripheral wall 27 formed by a portion of the single pipe 24. Two disk-shaped upper and lower chamber walls 29 and 30 are disposed in an annular space within the housing 28. Each of the disk-shaped upper and lower chamber walls 29 and 30 is made of stainless steel or the like, and, as shown in FIGS. 11 and 12, has two peripheral through holes 31 and a center through hole 32 into which the unit pipes 20 and the single pipe 24 are fitted, respectively, and an outer peripheral surface which is in close contact with an inner peripheral surface of the outer peripheral wall 26. The two upper and lower chamber walls 29 and 30 divide the inside of the housing 28 into three chambers. Two of the three chambers function as upper and lower introduction chambers 34₁ and 34₂ which are defined between the bottom wall 14 and the upper chamber wall 29 and between the top wall 13 and the lower chamber wall 30, respectively, and in which the combustible gas is burned, and the remaining one chamber functions as a combustible gas introduction chamber 33 defined between the upper and lower chamber walls 29 and 30. Thus, the upper and lower introduction chambers 34₁ and 34₂ adjoin the combustion chambers 30 with the upper and lower chamber walls 29 and 30 interposed therebetween.

The upper introduction chamber 34₁ is defined by an upward-facing recess 56 defined in the upper chamber wall 29, and the bottom wall 4 which closes an opening of the recess 56. In the embodiment, the recess 56 comprises a plurality of grooves which are symmetric with respect to a straight line L extending through three centers of the center through hole 32 and the two peripheral through holes 31, as best shown in FIG. 11. Namely, located on opposite sides of the straight line L are a pair of semi-arcuate grooves 57 communicating at their opposite ends with the peripheral through holes 31; four pairs of arcuate grooves 58 extending from communication portions of the semi-arcuate grooves 57 with the peripheral through holes 31 with the semi-arcuate groove 57 interposed between each pair of the arcuate grooves 58; and two pairs of short straight grooves 59 each extending outward from each of the peripheral through holes 31 along the straight line L in such a manner that the straight line L bisects the width of the grooves 59.

The lower introduction chamber 342 is defined by a downward-facing recess 60 defined in the lower chamber wall 30, and the top wall 13 which closes an opening of the recess 60. As best shown in FIG. 12, the lower introduction chamber 342 is of a structure similar to a structure obtained by turning the upper chamber wall 29 upside down. Therefore, the recess 60 comprises a pair of semi-arcuate grooves 57, four pairs of arcuate grooves 58 each located on opposite sides of the semi-arcuate grooves 57, respectively, and two pairs of short straight grooves 59 located around the peripheral through holes 31, these grooves being similar to those of the recess 56.

Four combustible gas introduction ports 35 are defined in portions of each of the unit pipes 20 facing the upper and lower introduction chambers 341 and 342. As best shown in FIG. 11, two of the four combustible gas introduction ports 35 communicate with the joining portions, at opposite sides of each of the peripheral through holes 31, of the semi-arcuate grooves 57 and the pairs of the arcuate grooves 58, respectively, and the other two combustible gas introduction ports 35 communicate with the pair of the short straight grooves 59 located at opposite sides of each of the peripheral through holes 31, respectively.

Each of the upper and lower chamber walls 29 and 30 has a plurality of combustible gas inlets 36 which permit the upper and lower introduction chambers 341 and 342 to communicate with the combustion chamber 33. The inlets 36 are arranged so that one inlet is disposed at the top and one on either side of the top of each of the arcuate grooves 57; one inlet is disposed at the tip end and one at a substantially intermediate portion of each of the arcuate grooves 58; and one inlet is disposed in the tip end of each of the short straight grooves 59. In this manner, the plurality of combustible gas inlets 36 are arranged so that they are dispersed in the entire region of each of the upper and lower chamber walls 29 and 30.

Figure 13:
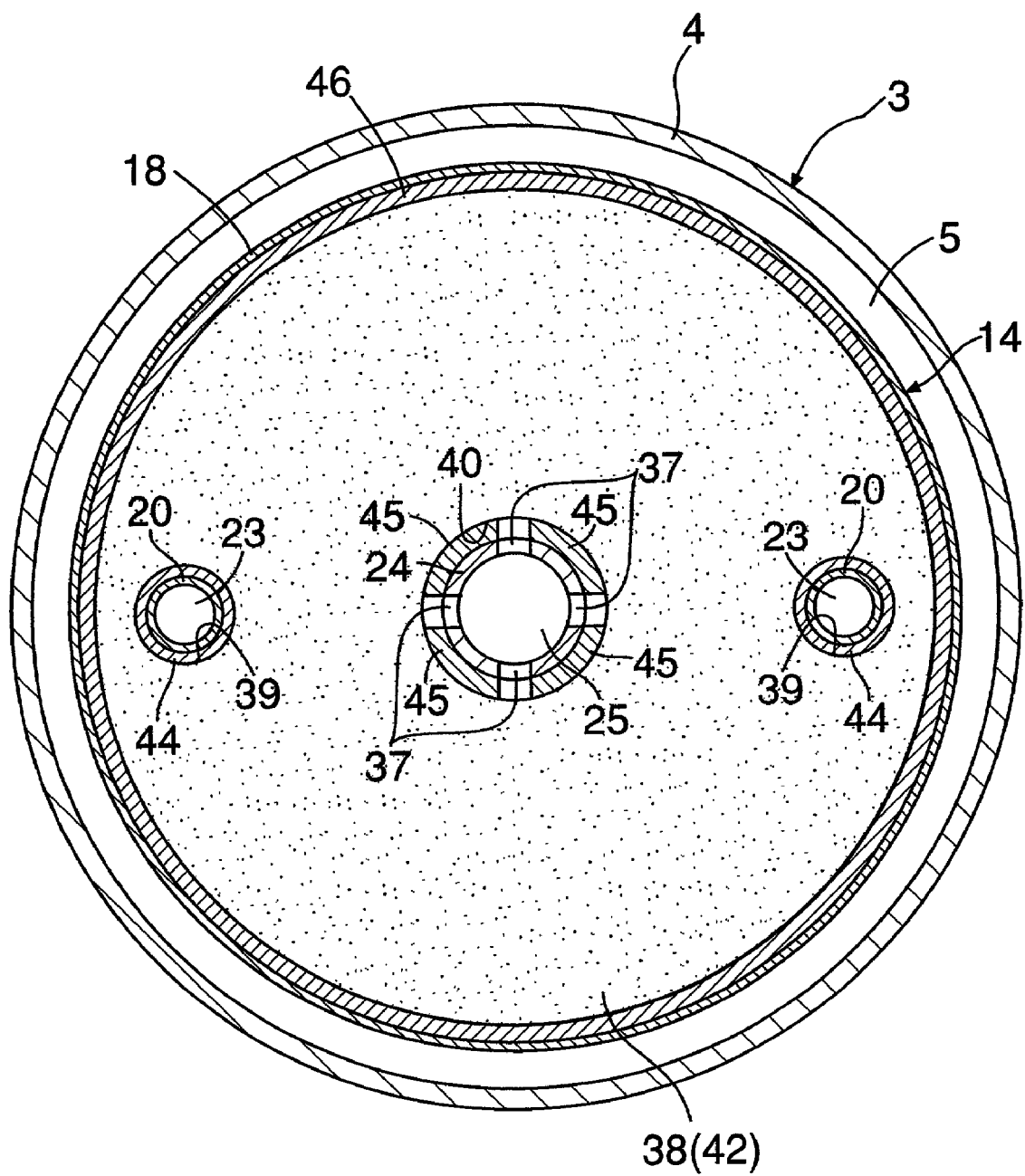
FIG. 13 is a sectional view taken along a line 13—13 in FIG. 10.

As shown in FIGS. 10 and 13, four combustion gas inlets 37 are defined in portions of the single pipe 24 facing the combustion chamber 33. A disk-shaped porous heat-resistant material 38 is disposed as a catalyst carrier within the combustion chamber 33 and clamped between the upper and lower chamber walls 29 and 30. The heat-resistant material 38 is made of metal (for example, Ni), ceramic or the like as in the previous embodiments, and has two peripheral through holes 39 and a center through hole 40 corresponding to the unit pipes 20 and the single pipe 24, respectively. As best shown in FIG. 7, a combustion gas burning catalyst 42 is carried on inner surfaces of the continuous pores 41 in the heat-resistant material 38 as in the previous embodiments. Platinum, palladium or the like is used as the burning catalyst as in the foregoing.

To maintain the combustion chamber 33, a plurality of spacers made of a metal such as stainless steel and Ni, ceramic or the like are disposed within the combustion chamber 33 and clamped between the upper and lower chamber walls 29 and 30. More specifically, in the heat-resistant material 38, an annular spacer 46 having a larger diameter is fitted between an outer peripheral surface of the heat-resistant material 38 and the inner peripheral surface of the outer peripheral wall 26; an annular spacer 44 having a smaller diameter is fitted between an inner peripheral surface of each peripheral through hole 39 and the outer peripheral surface of each unit pipe 20; and further, a quartered arcuate spacer 45 is fitted between the inner peripheral surface of the center through hole 40 and the outer peripheral surface of the single pipe 24, so that it does not close each of the outlets 37.

The arrangement of the other parts is substantially the same as in the first embodiment and hence, portions and components corresponding to those in the first embodiment are designated by the same reference numerals and symbols in FIGS. 10 to 13 and the detailed description of them is omitted.

To release hydrogen absorbed in the powdery hydrogen-absorption material HSM in each of the hydrogen storage units 9, a mixed gas of hydrogen and air is supplied into each of the first passages 23 through the lower end thereof to pass through the passage 23, as described above. In this process, the mixed gas is narrowed by the frustoconical top end 22 of the unit pipe 20 so that the mixed gas pool forms at a location downstream of the frustoconical top end 22. The mixed gas from the gas pool passes through the introduction ports 35 into the introduction chamber 34. The mixed gas flows in a jetted manner into the upper and lower combustion chambers 331 and 332 through the inlets 36 in the upper and lower chamber walls 29 and 30, where it is burned within the heat-resistant material 38 under the presence of the catalyst 42 such as platinum or the like. Thus, a combustion heat and heated water vapor serving as a combustion gas are produced, and the heated water vapor passes via the outlets 37 through the second passage 25.

In this case, the mixed gas can be supplied through the plurality of inlets 36 arranged in the dispersed manner into the combustion chambers 33, and the combustion of the mixed gas can be caused in the entire combustion chamber 33. Thus, the degree of ununiformity of the temperature profile of the heater 2 due to the combustion heat, can be decreased.

The combustion heat and thus the heat from the heater 2 is transmitted through wide heat transfer surfaces of the upper and lower chamber walls 29 and 30 to the powdery hydrogen-absorption material HSM, and the heat of the heated water vapor is transmitted through the single pipe 24 to the powdery hydrogen-absorption material HSM. Therefore, the powdery hydrogen-absorption material HSM is heated with a good efficiency, which permits a rapid hydrogen desorption from the wide hydrogen absorption desorption surface 8, and the thus-released hydrogen passes through the hydrogen passage 5.

To absorb hydrogen into the powdery hydrogen-absorption material HSM, hydrogen is introduced into the hydrogen passage 5. The hydrogen passes through the filter 15 in each of the hydrogen storage units 9 over the entire periphery of the filter 15, and absorbed into the powdery hydrogen-absorption material HSM. In this case, cooling air is allowed to pass through the first passage 23, the upper and lower introduction chambers 341 and 342, the combustion chamber 33 and the second passage 25 to cool the powdery hydrogen-absorption material HSM with a good efficiency, whereby the accumulation of heat in the powdery hydrogen-absorption material HSM is avoided.

Figure 14:
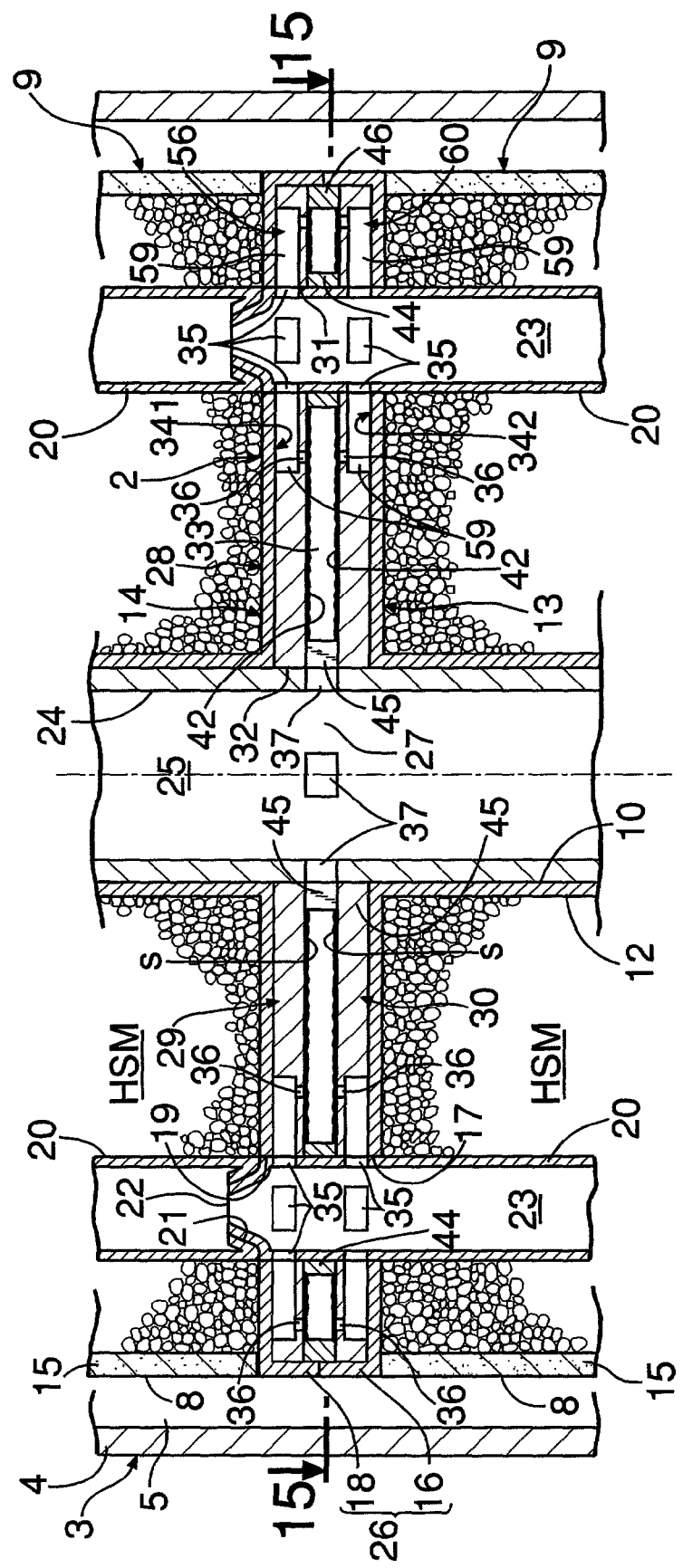
FIG. 14 is a sectional view similar to FIG. 3, but showing an essential portion of a fourth embodiment of the hydrogen storage system.
Figure 15:
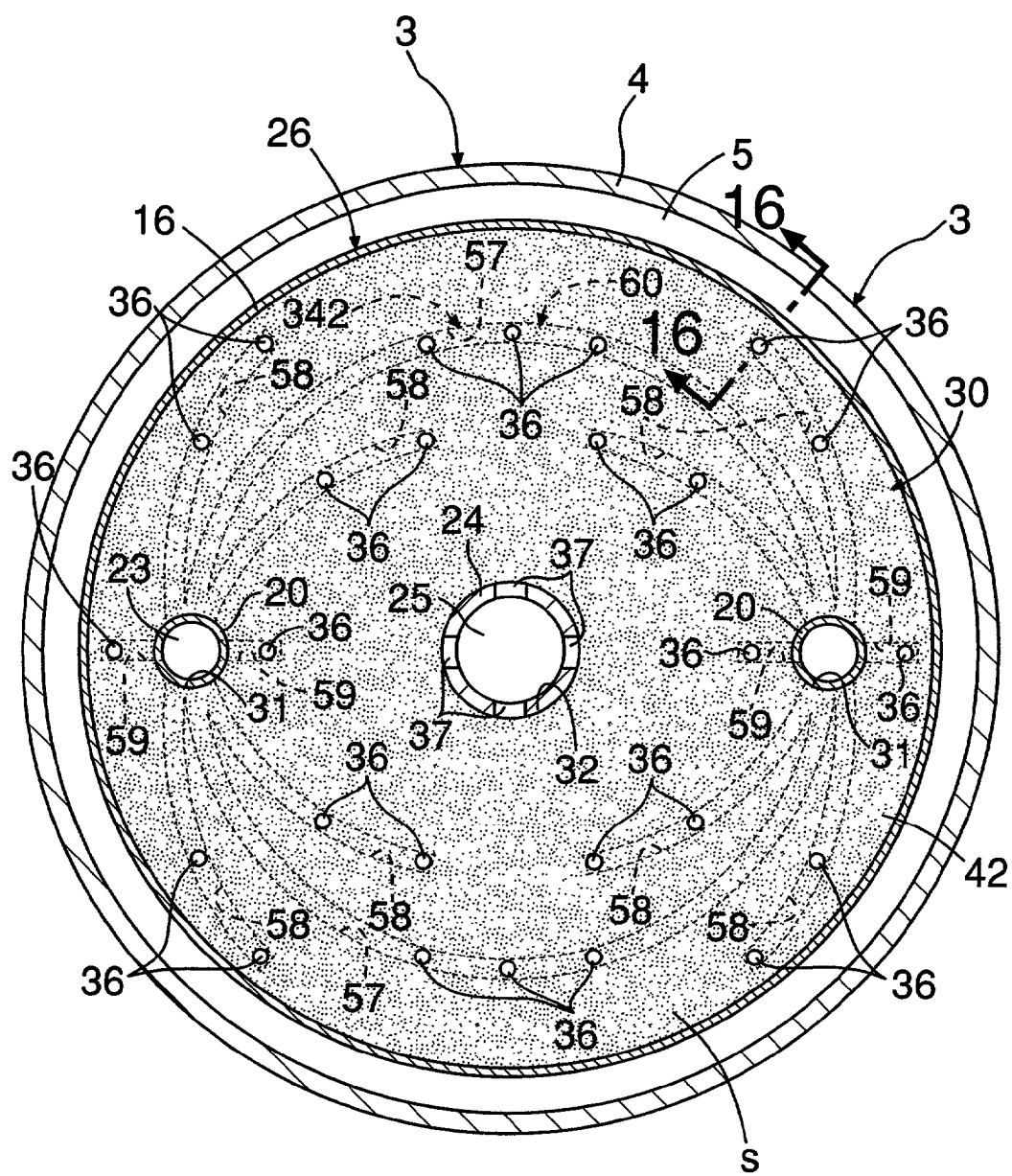
FIG. 15 is a sectional view taken along a line 15—15 in FIG. 14.
Figure 16:
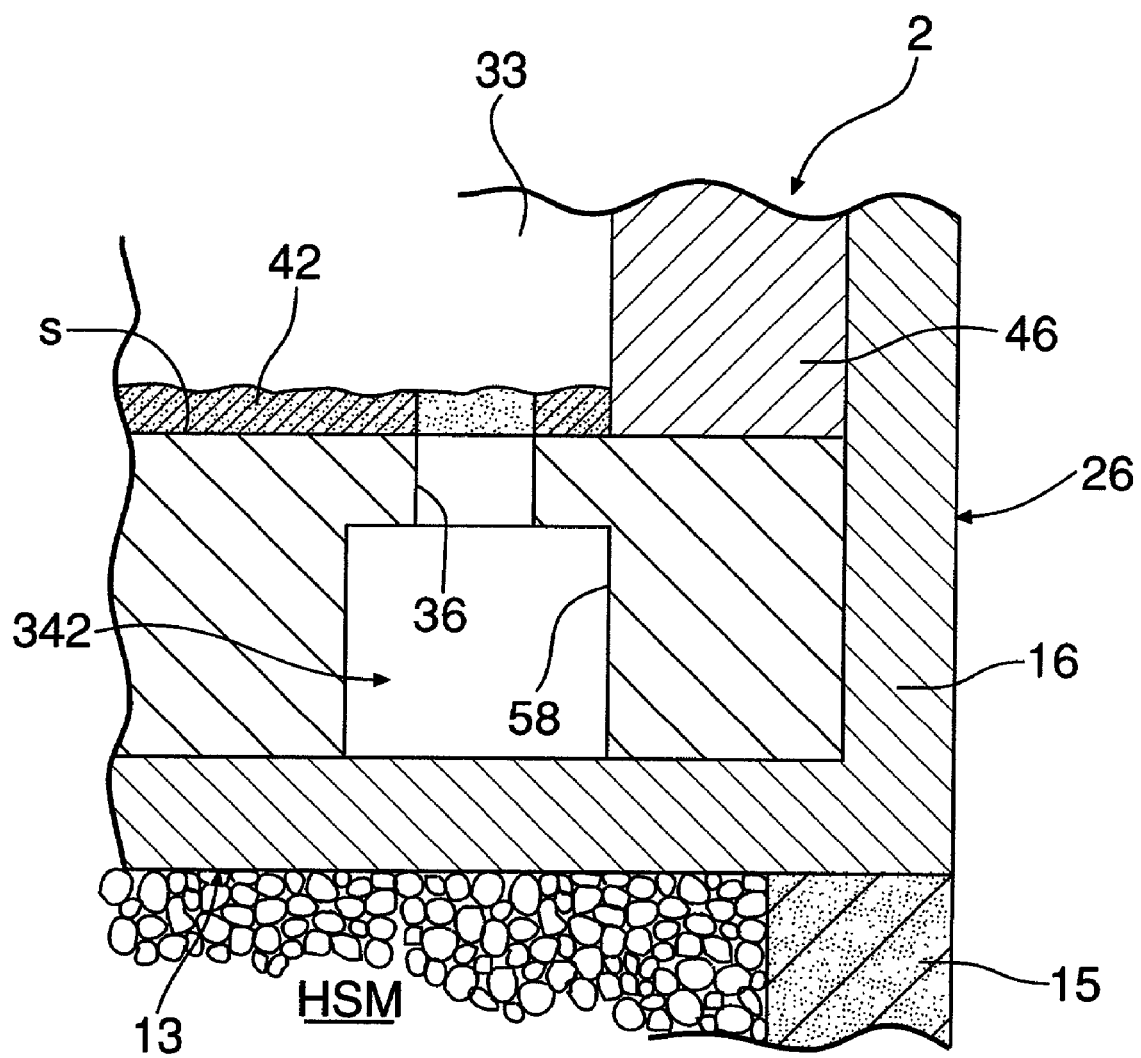
FIG. 16 is a sectional view taken along a line 16—16 in FIG. 15.

FIGS. 14 to 16 show a fourth embodiment of a heater 2 in the hydrogen storage system 1. In this case, the catalyst carrier is an inner surface s of a combustion chamber 33, i.e., opposed non-grooved outer surfaces of upper and lower chamber walls 29 and 30 in the embodiment, and a layer of a catalyst 42 is applied and formed on each of the outer surfaces. The arrangement of the other parts is substantially the same as in the third embodiment and hence, portions or components corresponding to those in the third embodiment are designated by the same reference numerals and symbols in FIGS. 14 to 16, and the detailed description of them is omitted.

The third and fourth embodiments may be modified in such a manner that one of the upper and lower introduction chambers 341 and 342 is omitted. In addition, in the first to fourth embodiments, a plurality of hydrogen storage modules 6 may be placed within a large-sized outer cylinder 3.

As described above, according to the present invention, it is possible to provide a heater for a hydrogen storage system, in which the degree of ununiformity of the temperature profile can be decreased to conduct the release of hydrogen with a good efficiency.

What is claimed is:

1. A heater for a hydrogen storage system, which is disposed between and in contact with a pair of separate cylindrical hydrogen storage units filled with a hydrogen-absorption material, the heater is of a cylindrical shape and comprises:
    at least one combustion chamber which includes a catalyst carrier and a combustible gas that is burned therein;
    a combustible gas burning catalyst carried on said catalyst carrier;
    at least one combustible gas introduction chamber adjoining the at least one combustion chamber via a chamber wall interposed therebetween;
    a plurality of combustible gas inlets disposed in a dispersed manner in said chamber wall of the at least one combustible gas introduction chamber to permit the at least one combustion chamber and said gas introduction chamber to communicate with each other;
    a combustion gas outlet communicating directly with the at least one combustion chamber; and
    a first passage which communicates with said combustion gas outlet and extends through a center portion of said cylindrical hydrogen storage units.

2. A heater for a hydrogen storage system according to claim 1, wherein the first passage is defined within a pipe wherein the combustible gas introduction chamber extends in a direction orthogonal relative to a longitudinal axis of the pipe.

3. A heater for a hydrogen storage system according to claim 1, wherein the at least one combustible gas introduction chamber includes two combustible gas introduction chambers having the at least one combustion chamber interposed therebetween.

4. A heater for a hydrogen storage system according to claim 1, 2, or 3, wherein said catalyst carrier is a porous heat-resistant material disposed within the at least one combustion chamber.

5. A heater for a hydrogen storage system according to claim 1, 2, or 3, wherein said catalyst carrier is disposed between the at least one gas introduction combustion chamber and the at least one combustion chamber.

6. A heater for a hydrogen storage system according to claim 2, wherein each of the combustible gas inlets communicates with a second passage which extends parallel to a longitudinal axis of the pipe.

7. A heater for a hydrogen storage system according to claim 1, further comprising a second passage defined therein to extend through said heater and said hydrogen storage units in parallel with said first passage, said second passage communicating with said combustible gas introduction chamber through said combustible gas inlets.

8. A heater for a hydrogen storage system according to claim 7, wherein said second passage comprises a pair of secondary passages located on a diametrical line passing said first passage, said secondary passages being located at equal distances from said first passage.

9. A heater for a hydrogen storage system according to claim 1, wherein said heater is housed inside an outer cylinder of said hydrogen storage system and a hydrogen passage is defined between an outer peripheral surface of the heater and an inner peripheral surface of the outer cylinder.

* * * * *